United States Patent
Yamaguchi et al.

(10) Patent No.: US 9,843,659 B2
(45) Date of Patent: Dec. 12, 2017

(54) MOBILE ELECTRONIC DEVICE AND METHOD FOR WATERPROOFING MOBILE ELECTRONIC DEVICE

(71) Applicant: FUJITSU LIMITED, Kawasaki-shi, Kanagawa (JP)

(72) Inventors: Atsushi Yamaguchi, Kawasaki (JP); Shingo Yamaguchi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 388 days.

(21) Appl. No.: 14/170,717

(22) Filed: Feb. 3, 2014

(65) Prior Publication Data
US 2014/0294217 A1    Oct. 2, 2014

(30) Foreign Application Priority Data
Mar. 29, 2013    (JP) .................................. 2013-074982

(51) Int. Cl.
*H04M 1/03*    (2006.01)
*H04R 1/02*    (2006.01)
(Continued)

(52) U.S. Cl.
CPC ........... *H04M 1/035* (2013.01); *G06F 1/1626* (2013.01); *G06F 1/1688* (2013.01); *G06F 1/182* (2013.01);
(Continued)

(58) Field of Classification Search
USPC .................. 381/334, 359; 224/666, 191, 667
See application file for complete search history.

(56) References Cited

U.S. PATENT DOCUMENTS 6,188,773 B1 *  2/2001  Murata ................. H04R 1/005
                                                128/201.19
8,485,404 B2 *  7/2013  Monaco et al. .............. 224/666
(Continued)

FOREIGN PATENT DOCUMENTS

CN    101861738 A        10/2010
CN    202071421 U    *   12/2011
(Continued)

OTHER PUBLICATIONS

Chinese Office Action and its English Language Translation dated May 5, 2016, issued in corresponding CN Application No. 201410066803.7.

*Primary Examiner* — Davetta W Goins
*Assistant Examiner* — Kuassi Ganmavo
(74) *Attorney, Agent, or Firm* — Squire Patton Boggs (US) LLP

(57) ABSTRACT

A mobile electronic device includes: a housing; an acoustic-component contained in the housing; a sound hole formed in the housing, the sound hole being configured to allow communication between an inside and an outside of the housing; a non-breathable waterproof film disposed inside the housing, the waterproof film being configured to cover the sound hole; a compressible member compressed by being pressed against the housing during assembly of the acoustic-component to the housing, the compressible member being configured to form an acoustic-component chamber together with at least the waterproof film, the acoustic-component chamber being configured to hermetically seal the acoustic-component; and an opening configured to allow communication between an inside and an outside of the acoustic-component chamber within the housing, the opening being configured to allow air in the acoustic-component
(Continued)

chamber to escape to the outside before the opening is closed in the process of compressing the compressible member.

2 Claims, 8 Drawing Sheets

(51) Int. Cl.
    *H04M 1/18*            (2006.01)
    *G06F 1/18*             (2006.01)
    *G06F 1/16*             (2006.01)

(52) U.S. Cl.
    CPC ....... *G06F 2200/1633* (2013.01); *H04M 1/18* (2013.01); *H04M 1/185* (2013.01); *H04R 1/02* (2013.01); *H04R 1/028* (2013.01); *H04R 2499/11* (2013.01); *Y10S 2/05* (2013.01)

(56) References Cited

U.S. PATENT DOCUMENTS

| | | | | |
|---|---|---|---|---|
| 2009/0290741 | A1* | 11/2009 | Daley | H04R 1/086 381/359 |
| 2010/0072561 | A1* | 3/2010 | Lee | B81C 1/00182 257/415 |
| 2011/0255728 | A1* | 10/2011 | Abe | H04R 1/086 381/355 |
| 2011/0261986 | A1* | 10/2011 | Murayama | G01M 3/26 381/332 |
| 2011/0272769 | A1* | 11/2011 | Song | H04R 19/005 257/416 |
| 2012/0202559 | A1* | 8/2012 | Shiogama | H04M 1/035 455/550.1 |
| 2013/0010992 | A1* | 1/2013 | Koester | H04R 25/65 381/322 |
| 2013/0063004 | A1* | 3/2013 | Lai et al. | 312/223.1 |
| 2013/0223656 | A1* | 8/2013 | Iuchi | H04R 1/023 381/189 |
| 2014/0161290 | A1* | 6/2014 | Jenkins | B81B 3/0021 381/174 |

FOREIGN PATENT DOCUMENTS

| | | | |
|---|---|---|---|
| JP | 2007-037189 A | | 2/2007 |
| JP | 2008-278064 A | | 11/2008 |
| JP | 2010-041671 A | | 2/2010 |
| JP | 2011188191 A | * | 9/2011 |

* cited by examiner

MOBILE ELECTRONIC DEVICE AND METHOD FOR WATERPROOFING MOBILE ELECTRONIC DEVICE

CROSS-REFERENCE TO RELATED APPLICATION

This application is based upon and claims the benefit of priority of the prior Japanese Patent Application No. 2013-074982, filed on Mar. 29, 2013, the entire contents of which are incorporated herein by reference.

FIELD

The embodiments discussed herein are related to a mobile electronic device and a method for waterproofing the mobile electronic device.

BACKGROUND

Mobile electronic devices that are portable outdoors, such as mobile phones, notebook computers, and tablet computers, may include acoustic components, such as a microphone and a speaker. In assembly of such an acoustic component to a housing, a compressible member made of a compressible material, such as rubber or polyurethane foam, may be placed between the housing and the acoustic component or a substrate for mounting the acoustic component, so that the acoustic component is assembled while the compressible member is being compressed. By assembling the acoustic component in this manner, it is possible to cut off an acoustic component chamber containing the acoustic component from the other space in the housing, and improve airtightness of the acoustic component chamber. This makes it possible to reduce leakage of sound from the acoustic component chamber, reduce entry of noise from the other space in the housing into the acoustic component chamber, and improve sensitivity of the acoustic component.

In a mobile electronic device including an acoustic component as described above, a device case (housing) is provided with a sound hole which allows input of sound from the outside into the acoustic component and output of sound to the outside. The sound hole is covered with a protective sheet having a waterproof and dustproof function.

A related technique has been proposed in which a sound hole in a housing is covered with a porous protective sheet, so as to ensure breathability (gas permeability) and waterproof and dustproof performance. However, for example, if the electronic device has been dropped in water many times, clogging or crystallization may occur in micropores of the porous protective sheet. For example, if the porous protective sheet is clogged with a surface-active agent or the surface-active agent is crystallized, the surface-active agent may be dissolved when the electronic device is dropped in water later on. As a result, the waterproof function of the porous protective sheet may be lost. Crystallization of seawater may also cause loss of the waterproof function of the porous protective sheet.

Related technique is disclosed in, for example, Japanese Laid-open Patent Publication Nos. 2007-37189, 2010-41671, and 2008-278064.

To ensure the waterproof function even if the electronic device has been dropped in water many times, the sound hole in the device case may be covered with a non-breathable protective sheet. However, in this instance, there is nowhere for air in the acoustic component chamber to escape.

Therefore, the resulting increase in internal pressure of the acoustic component chamber during assembly of the acoustic component to the housing may damage, for example a diaphragm (vibrating plate) of the acoustic component. The increased pressure in the acoustic component chamber may cause displacement of the diaphragm of the acoustic component, degrade sensitivity of the acoustic component, and lead to production variations.

SUMMARY

According to an aspect of the invention, A mobile electronic device includes: a housing; an acoustic-component contained in the housing; a sound hole formed in the housing, the sound hole being configured to allow communication between an inside and an outside of the housing; a non-breathable waterproof film disposed inside the housing, the waterproof film being configured to cover the sound hole; a compressible member compressed by being pressed against the housing during assembly of the acoustic-component to the housing, the compressible member being configured to form an acoustic-component chamber together with at least the waterproof film, the acoustic-component chamber being configured to hermetically seal the acoustic-component; and an opening configured to allow communication between an inside and an outside of the acoustic-component chamber within the housing, the opening being configured to allow air in the acoustic-component chamber to escape to the outside before the opening is closed in the process of compressing the compressible member.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Mobile electronic devices and methods for waterproofing the same according to embodiments will now be described in detail with reference to the drawings.

Embodiments

Figure 1:
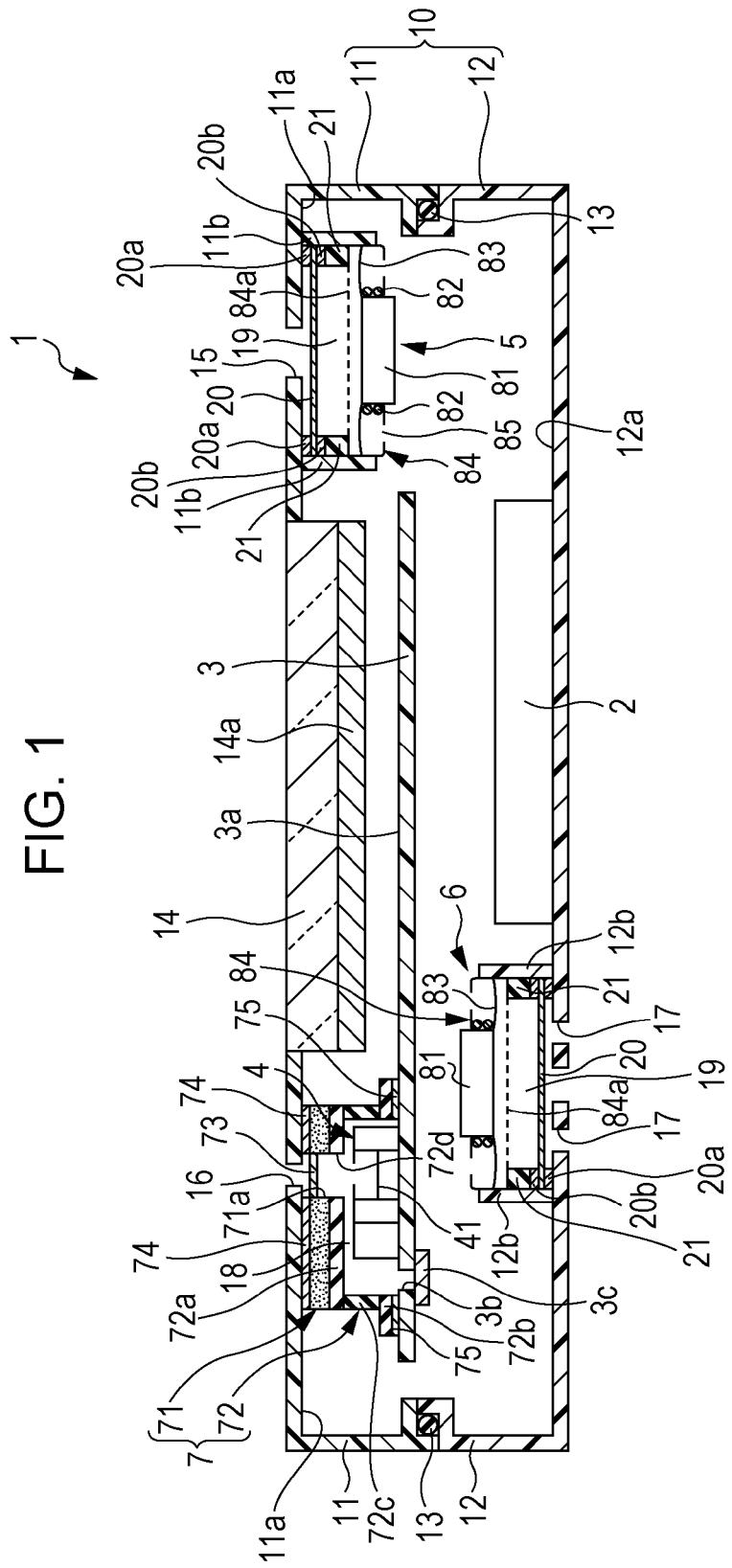
FIG. 1 is a cross-sectional view of a mobile phone serving as a mobile electronic device according to an embodiment.

FIG. 1 is a cross-sectional view of a mobile phone 1 serving as a mobile electronic device according to an embodiment. The mobile phone 1 in the present embodiment is an example of the mobile electronic device. The mobile phone 1 includes a device case 10 that contains various components. The device case 10 has a front case 11 and a rear case 12, each of which may be molded of a synthetic resin, such as polycarbonate or acrylonitrile butadiene styrene (ABS) resin. The front case 11 and the rear case 12 are coupled to each other, with a waterproof gasket 13 sandwiched therebetween. The device case 10 is an example of a housing.

The front case 11 has a liquid-crystal display panel 14. A touch panel module 14a is disposed on the back side of the liquid-crystal display panel 14 and functions as an operation input unit. The front case 11 is provided with a first speaker sound hole 15 and a microphone sound hole 16 at its end portions in the longitudinal direction. The first speaker sound hole 15 and the microphone sound hole 16 are for use in a call function. The first speaker sound hole 15 is located at one end of the front case 11 in the longitudinal direction, and the microphone sound hole 16 is located at the other end of the front case 11 in the longitudinal direction. The first speaker sound hole 15 and the microphone sound hole 16 are formed to pass through the front case 11 and allow communication between the inside and the outside of the device case 10. The rear case 12 is provided with a second speaker sound hole 17, which allows communication between the inside and the outside of the device case 10.

A battery holder formed inside the rear case 12 contains a battery 2. There is a removable battery cover (not illustrated) at a position corresponding to the battery holder in the rear case 12. The battery 2 is made accessible by removing the battery cover. The battery 2 is a power source for driving the mobile phone 1.

The device case 10 contains a control board 3, a microphone 4, a first speaker 5, and a second speaker 6. The microphone 4 is an acoustic component that converts sound into an electrical signal. In the present embodiment, the microphone 4 converts sound obtained through the microphone sound hole 16 into an electrical signal. The microphone 4 is mounted on, and electrically connected to, the control board 3.

The control board 3 is disposed in the planar direction of the front case 11 and the rear case 12. The microphone 4 is mounted on a surface of the control board 3 facing the front case 11. The microphone 4 has a sound receiving diaphragm (vibrating plate) 41 for receiving sound. The diaphragm 41 is disposed to face the microphone sound hole 16 in the front case 11. The microphone 4 detects displacement of the diaphragm 41 that vibrates in response to the pressure of sound that has entered the case through the microphone sound hole 16. Then, the microphone 4 converts the received sound into an electrical signal.

In the mobile phone 1 according to the present embodiment, a compressible member 7 made of a compressible material is disposed inside the device case 10. The microphone 4 mounted on the control board 3 is covered with the compressible member 7. Specifically, the compressible member 7 has a first compression portion 71 and a second compression portion 72. After assembly of the microphone 4, the compressible member 7 is in a compressed state between an inner surface 11a of the front case 11 and a mounting surface 3a of the control board 3 on which the microphone 4 is mounted. Thus, since the compressible member 7 is flatter than it originally was, it is possible to ensure high airtightness of a microphone chamber 18 (described below) that contains the microphone 4, and improve sensitivity of the microphone 4.

Figure 2:
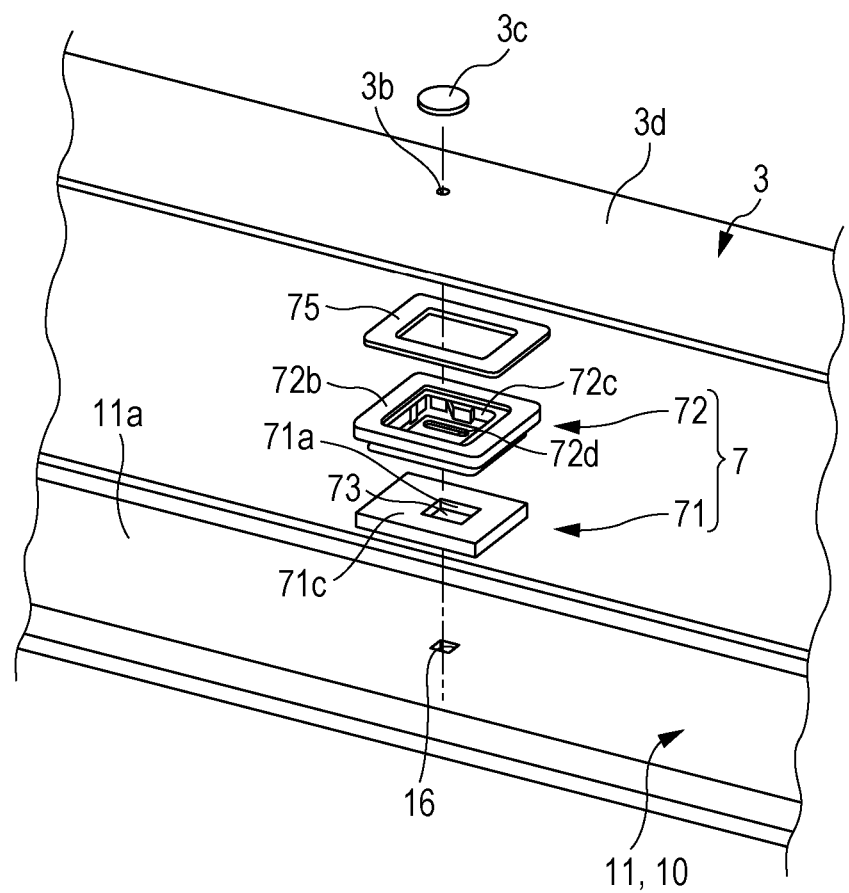
FIG. 2 is an exploded perspective view schematically illustrating a waterproof structure of a microphone according to the embodiment.
Figure 3:
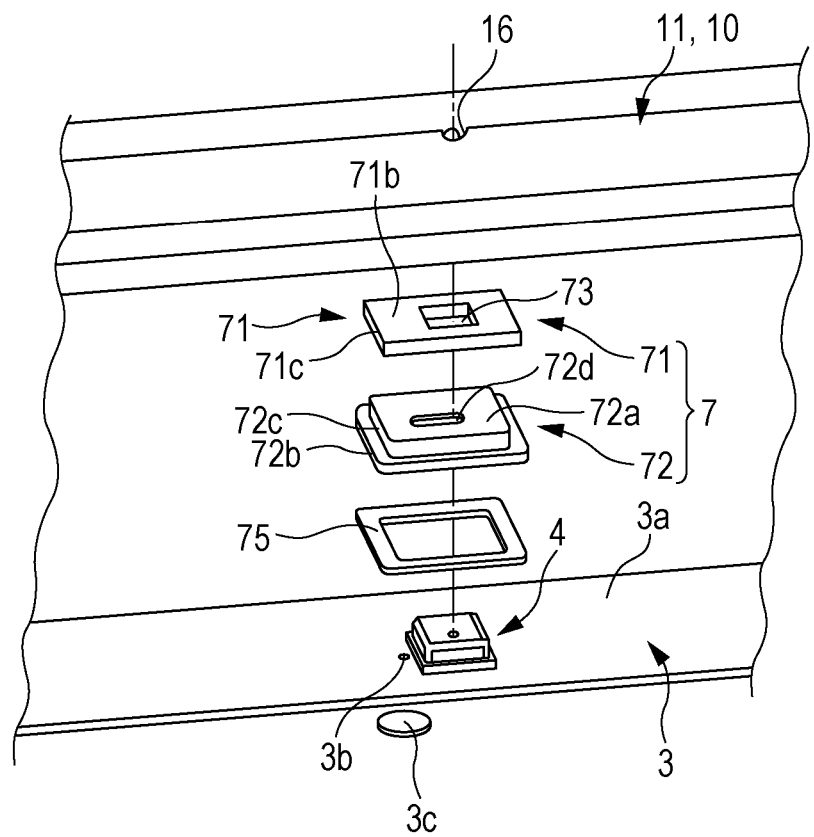
FIG. 3 is another exploded perspective view schematically illustrating the waterproof structure of the microphone according to the embodiment.

The mobile phone 1 has a waterproof and dustproof structure for reducing entry of water and dust through the microphone sound hole 16 into the device case 10. FIGS. 2 and 3 are each an exploded perspective view schematically illustrating a waterproof structure of the microphone 4. The first compression portion 71 of the compressible member 7 is substantially in the shape of a rectangular parallelepiped and is made of a compressible material, such as polyurethane foam. The first compression portion 71 has a through hole 71a that passes therethrough in the thickness direction thereof. A waterproof film 73 is provided to close the through hole 71a. The waterproof film 73 is a waterproof sheet having non-breathability and sound transmission characteristics. For example, the waterproof film 73 is made of polyethylene terephthalate (PET), polyethylene (PE), or polypropylene (PP). As illustrated in FIG. 1, the waterproof film 73 is disposed at a position corresponding to the microphone sound hole 16 so as to cover the microphone sound hole 16.

One principle surface of the first compression portion 71 is referred to as a "first principal surface 71b", and the other principal surface of the first compression portion 71 is referred to as a "second principal surface 71c". The first principal surface 71b of the first compression portion 71 is disposed to face the inner surface 11a of the front case 11. As illustrated in FIG. 1, the first principal surface 71b of the first compression portion 71 is bonded to the inner surface 11a of the front case 11 with a double-sided tape 74 therebetween. This secures the first compression portion 71 to the front case 11. Since the waterproof film 73 held by the first compression portion 71 is located to coincide with the microphone sound hole 16 in the front case 11, it is possible to reduce entry of water and dust through the microphone sound hole 16 into the microphone chamber 18.

The second compression portion 72 of the compressible member 7 is made of a compressible material, such as rubber. The second compression portion 72 has a first pad 72a that faces the second principal surface 71c of the first compression portion 71, a second pad 72b that faces the mounting surface 3a of the control board 3 having the microphone 4 mounted thereon, and a peripheral wall 72c that connects the first pad 72a to the second pad 72b. The first pad 72a of the second compression portion 72 is substantially rectangular in outer shape and has substantially the same size as that of the second principal surface 71c of the first compression portion 71. The first pad 72a of the second compression portion 72 and the second principal surface 71c of the first compression portion 71 are pressed against each other. The first pad 72a of the second compression portion 72 is provided with a through hole 72d that passes through the first pad 72a in the thickness direction. The through hole 72d allows sound that has entered the device case 10 through the microphone sound hole 16 to pass through.

As illustrated in FIG. 2, the second pad 72b of the second compression portion 72 has a flat annular shape. The peripheral wall 72c of the second compression portion 72 extends substantially vertically from both the first pad 72a and the second pad 72b. The first pad 72a and the second pad 72b are connected to each other by the peripheral wall 72c. The second pad 72b of the second compression portion 72 is attached with a double-sided tape 75 to the mounting surface 3a of the control board 3 while being pressed against the mounting surface 3a.

In the mobile phone 1, the microphone chamber 18 that hermetically contains the microphone 4 is formed (defined) by the compressible member 7 (having the first compression portion 71 and the second compression portion 72), the waterproof film 73, and the mounting surface 3a of the control board 3. This allows the microphone chamber 18 to be cut off from the other space in the device case 10. The microphone chamber 18 is an example of an acoustic component chamber. The front case 11 and the control board 3 are fastened together with fastening members, such as fixing screws (not illustrated). Fastening the control board 3 to the front case 11 secures the microphone 4 to the front case 11. In the process of tightening the fixing screws, a compressive force acts on the compressible member 7 (having the first compression portion 71 and the second compression portion 72), so that the compressible member 7 is compressed by a predetermined amount in the thickness direction.

The control board 3 is provided with an air escape hole 3b near the microphone 4. The air escape hole 3b is a through hole that passes through the control board 3 in the thickness direction. The air escape hole 3b in the control board 3 is located in a region inside the microphone chamber 18. As illustrated in FIG. 1, after assembly of the microphone 4, the air escape hole 3b in the control board 3 is closed by a cover member 3c. For example, the cover member 3c may be an adhesive or an adhesive tape attached to a back surface 3d of the control board 3 opposite the mounting surface 3a so as to close the air escape hole 3b.

Sound that has entered the microphone chamber 18 from the outside through the microphone sound hole 16 is obtained by the microphone 4 and converted into an electrical signal. In the mobile phone 1 of the present embodiment, after assembly of the microphone 4, the compressible member 7 is in a compressed state and high airtightness of the microphone chamber 18 may be ensured. It is thus possible to improve sensitivity of the microphone 4.

Next, the first speaker 5 and the second speaker 6 in the mobile phone 1 will be described. The first speaker 5 and the second speaker 6 are each an acoustic component that converts an electrical signal into sound, and are electrically connected via a wiring cable (not illustrated) to the control board 3. In the present embodiment, the first speaker 5 functions as a speaker that outputs voice for reception in the mobile phone 1. Sound output from the first speaker 5 is emitted through the first speaker sound hole 15 to the outside. The second speaker 6 functions as a speaker that outputs bell sound or voice for a so-called hands-free call of the mobile phone 1. Sound output from the second speaker 6 is emitted through the second speaker sound hole 17 to the outside.

The first speaker 5 and the second speaker 6 have the same structure, and each include a magnet 81, a coil 82, and a diaphragm (vibrating plate) 83. The coil 82 is placed around the magnet 81 and secured to the diaphragm 83 having a thin-plate shape. The diaphragm 83 vibrates when current including a sound signal is applied through the control board 3 to the coil 82. This changes air pressure and produces sound. The sound output from the first speaker 5 is emitted through the first speaker sound hole 15 to the outside. Similarly, sound output from the second speaker 6 is emitted through the second speaker sound hole 17 to the outside. The first speaker 5 and the second speaker 6 are each protected by being covered with a speaker cover 84. The speaker cover 84 is substantially in the shape of a rectangular parallelepiped in the present embodiment, but may be of other shapes.

The front case 11 has a first rib 11b that surrounds the first speaker sound hole 15. The first rib 11b protrudes from the inner surface 11a of the front case 11 toward the inside of the device case 10. The speaker cover 84 for the first speaker 5 is fitted in the first rib 11b. Similarly, the rear case 12 has a second rib 12b that surrounds the second speaker sound hole 17. The second rib 12b protrudes from an inner surface 12a of the rear case 12 toward the inside of the device case 10. The speaker cover 84 for the second speaker 6 is fitted in the second rib 12b. Hereinafter, a portion of the speaker cover 84 that covers the front side of the diaphragm 83 will be referred to as a front cover portion 84a. Although the speaker cover 84 in the present embodiment is made of stainless steel, other materials may be used to form the speaker cover 84. The speaker cover 84 is provided with a rear sound hole 85 on the back side thereof. The rear sound hole 85 is for improved acoustic characteristics of the speaker. Sound having a phase opposite that of sound emitted from the first speaker sound hole 15 is emitted through the rear sound hole 85 into the device case 10.

The mobile phone 1 has a waterproof and dustproof structure for reducing the entry of water and dust through the first speaker sound hole 15 and the second speaker sound hole 17 into the device case 10. As illustrated in FIG. 1, the first speaker 5 is provided with a waterproof film 20 and a compressible member 21 disposed in this order between the inner surface 11a and the first rib 11b of the front case 11. Similarly, the second speaker 6 is provided with the waterproof film 20 and the compressible member 21 disposed in this order between the inner surface 12a and the second rib 12b of the rear case 12. The waterproof films 20 are each a waterproof sheet having non-breathability and sound transmission characteristics and disposed to cover the first speaker sound hole 15 or the second speaker sound hole 17. Like the waterproof film 73 described above, the waterproof film 20 may be made, for example, of polyethylene terephthalate (PET), polyethylene (PE), or polypropylene (PP).

Double-sided tapes 20a and 20b are attached to both sides (front and back sides) of the edge of the waterproof film 20. The inner surface 11a of the front case 11 (or the inner surface 12a of the rear case 12) is bonded with the double-sided tape 20a to the waterproof film 20, which is bonded with the double-sided tape 20b to the compressible member 21.

Like the compressible member 7 described above, the compressible member 21 is made of a compressible material, such as polyurethane foam or rubber. As illustrated in FIG. 1, after assembly of the first speaker 5 and the second speaker 6 to the device case 10, the compressible member 21 is in a more compressed state (flatter) than it originally was in the thickness direction. Since the compressible member 21 is thus in a compressed state after assembly of the first speaker 5 and the second speaker 6, it is possible to ensure high airtightness of a speaker chamber 19, and improve sensitivity of the first speaker 5 and the second speaker 6. Like the second pad 72b of the second compression portion 72 described above, the compressible member 21 is annular in plan view. In the mobile phone 1, the speaker chamber 19 that hermetically contains each of the first speaker 5 and the second speaker 6 is formed by the compressible member 21, the waterproof film 20, and the speaker cover 84. The speaker chamber 19 is cut off from the other space in the device case 10. The speaker chamber 19 is an example of the acoustic component chamber.

A process of assembling acoustic components, such as the microphone 4, the first speaker 5, and the second speaker 6, to the device case 10 will now be described in detail. First, a process of assembling the microphone 4 will be described. In assembling the microphone 4, as illustrated in FIGS. 2 and 3, the first compression portion 71 of the compressible member 7 is attached to the inner surface 11*a* of the front case 11 with the double-sided tape 74 (see FIG. 1) therebetween. That is, the first principal surface 71*b* of the first compression portion 71 is attached with the double-sided tape 74 to the inner surface 11*a* of the front case 11. Additionally, the second compression portion 72 of the compressible member 7 is attached with the double-sided tape 75 to the control board 3 having the microphone 4 mounted thereon. Then, the control board 3 (microphone 4) is secured to the front case 11 by tightening the fixing screws (not illustrated) for fastening the control board 3 (microphone 4) to the front case 11.

In tightening the fixing screws for fastening the control board 3 (microphone 4) to the front case 11, a compressive force acts on the compressible member 7 (having the first compression portion 71 and the second compression portion 72), so that the compressible member 7 is compressed in the thickness direction. Thus, by compressing the compressible member 7 during assembly of the microphone 4, it is possible to enhance hermeticity of the microphone chamber 18 and improve sensitivity of the microphone 4.

Compressing the compressible member 7 during assembly of the microphone 4 reduces the capacity of the microphone chamber 18. The waterproof film 73 that covers the microphone sound hole 16 does not allow air to pass therethrough. This means that if there is nowhere for air (pressure) in the microphone chamber 18 to escape during assembly of the microphone 4, the resulting increase in internal pressure of the microphone chamber 18 may damage the diaphragm 41 of the microphone 4. The increase in internal pressure of the microphone chamber 18 may cause continuous displacement of the diaphragm 41 and this may lead to production variations.

Figure 4:
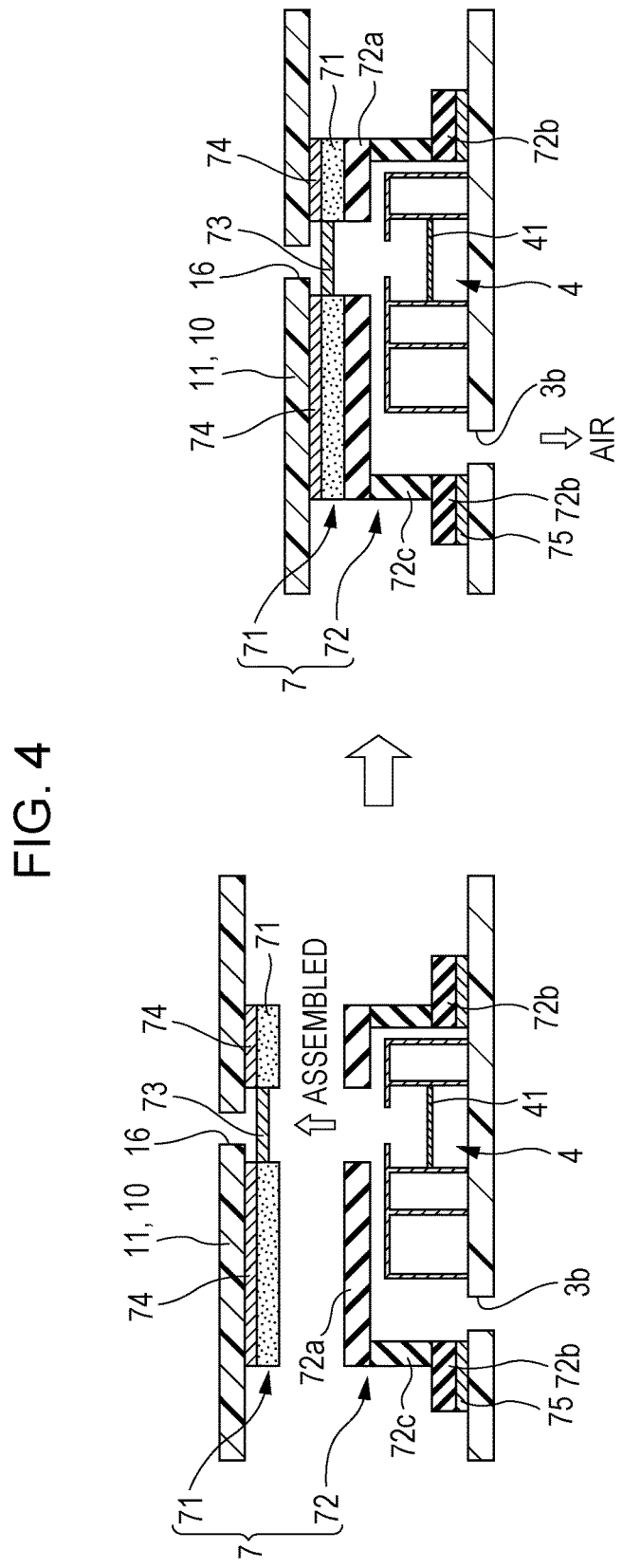
FIG. 4 illustrates a process of assembling the microphone according to the embodiment.

To reduce such problems, in the mobile phone 1 of the present embodiment, the air escape hole 3*b* in the control board 3 allows communication between the inside and the outside of the microphone chamber 18 within the device case 10. The air escape hole 3*b* is kept open until it is closed in the process of compressing the compressible member 7 during assembly of the microphone 4, and allows communication between the inside and the outside of the microphone chamber 18 within the device case 10. Therefore, as illustrated in FIG. 4, when the compressible member 7 is compressed during assembly of the microphone 4, air inside the microphone chamber 18 may escape through the air escape hole 3*b* to the outside of the microphone chamber 18 within the device case 10. It is thus possible to reduce an increase in pressure inside the microphone chamber 18, and reduce damage to the diaphragm 41 of the microphone 4. Since it is possible to reduce application of continuous displacement to the diaphragm 41 during assembly of the microphone 4, production variations may be made less likely to occur.

Figure 5:
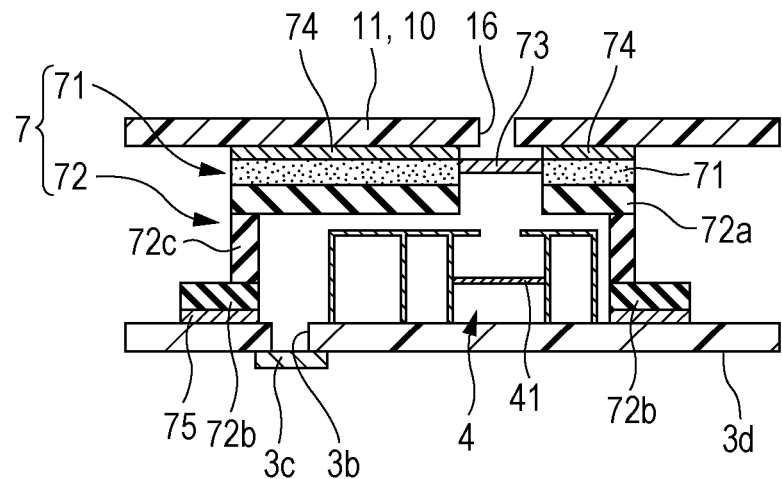
FIG. 5 also illustrates the process of assembling the microphone according to the embodiment.

The air escape hole 3*b* in the control board 3 is closed in the process of compressing the compressible member 7 during assembly of the microphone 4. When there is a predetermined amount by which the compressible member 7 is to be compressed during assembly of the microphone 4, the term "process of compressing" includes not only the state in which the amount of compression of the compressible member 7 has not yet reached the predetermined amount, but also the state in which the amount of compression of the compressible member 7 has reached the predetermined amount. For example, the configuration may be made such that the compressible member 7 is compressed by a predetermined amount at the point when the fixing screws for securing the microphone 4 to the front case 11 are fully tightened, and that the air escape hole 3*b* is closed after the amount of compression of the compressible member 7 reaches the predetermined amount. Alternatively, the air escape hole 3*b* may be closed before the amount of compression of the compressible member 7 reaches the predetermined amount. In the present embodiment, as illustrated in FIG. 5, after the compressible member 7 is compressed until the amount of compression of the compressible member 7 reaches a predetermined amount, the air escape hole 3*b* is closed by the cover member 3*c*, such as an adhesive seal. The cover member 3*c* may be attached to the back surface 3*d* of the control board 3 so as to close the air escape hole 3*b*.

In the present embodiment, in assembling the microphone 4 to the device case 10, before the air escape hole 3*b* is closed in the process of compressing the compressible member 7, the compressible member 7 is compressed while air in the microphone chamber 18 is being allowed to escape through the air escape hole 3*b* to the outside. Thus, even when a non-breathable sheet is used as the waterproof film 73, an excessive increase in pressure in the microphone chamber 18 during assembly of the microphone 4 may be reduced. Therefore, it is possible to reduce the occurrence of damage to a component of the microphone 4, such as the diaphragm 41, during assembly of the microphone 4, and to reduce production variations. Note that the term "outside" mentioned above refers to a region which is inside the device case 10 and outside the microphone chamber 18.

As described above, the waterproof film 73 having non-breathability may be used (that is, damage to components and production variations may be reduced even when such a waterproof film is used) in the present embodiment. Therefore, even if the mobile phone 1 has been dropped in water many times, a degradation of the waterproof function may be reduced. That is, without using a porous waterproof film, it is possible, during assembly, to allow air in the microphone chamber 18 to escape to the outside. Therefore, even if the mobile phone 1 has been dropped in water many times, it is possible not to cause clogging and crystallization in the waterproof film, and degradation of the waterproof function may be reduced.

In the present embodiment, the air escape hole 3*b* is closed by the cover member 3*c* in the process of compressing the compressible member 7. Therefore, the mobile phone 1 may be made available to the user with the air escape hole 3*b* closed. Since the hermeticity or airtightness of the microphone chamber 18 may be kept at a high level when the mobile phone 1 is made available to the user, a high sensitivity of the microphone 4 may be ensured. In the present embodiment, the air escape hole 3*b* is an example of an opening that allows communication between the inside and the outside of the acoustic chamber space.

Figure 6:
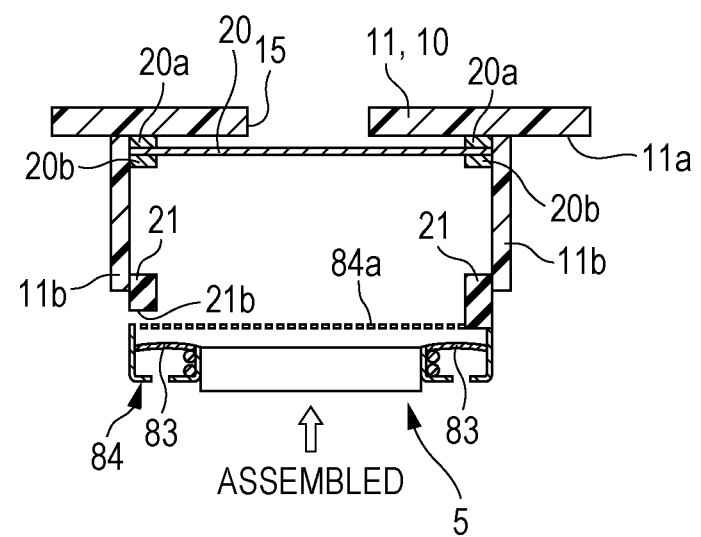
FIG. 6 illustrates a process of assembling a first speaker according to the embodiment.

A process of assembling the first speaker 5 and the second speaker 6 and a method for waterproofing them will now be described. The process of assembling and the method for waterproofing are common to both the first speaker 5 and the second speaker 6, and thus will be described only for the first speaker 5. In assembling the first speaker 5 to the device case 10, as illustrated in FIG. 6, the waterproof film 20 is attached with the double-sided tape 20a to the inner surface 11a of the front case 11 so as to cover the first speaker sound hole 15. Then, the first speaker 5 and the compressible member 21 attached to the front cover portion 84a of the speaker cover 84 are fitted into the first rib 11b on the inner surface 11a of the front case 11.

Figure 7:
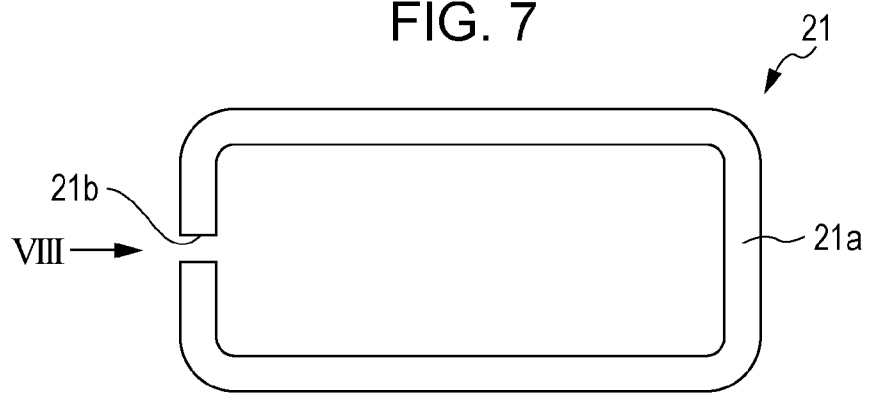
FIG. 7 illustrates a detailed structure of a compressible member according to the embodiment.
Figure 8:
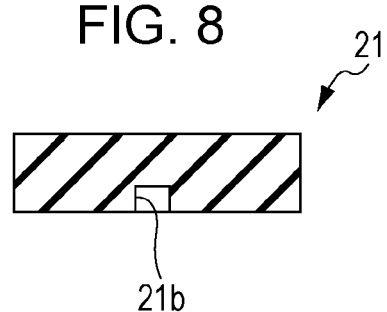
FIG. 8 illustrates the compressible member as viewed from the direction of arrow VIII in FIG. 7.

FIGS. 7 and 8 each illustrate a detailed structure of the compressible member 21. A surface of the compressible member 21 facing the front cover portion 84a of the speaker cover 84 will be referred to as a "bottom surface 21a". FIG. 7 illustrates the bottom surface 21a of the compressible member 21. FIG. 8 illustrates the compressible member 21 as viewed from the direction of arrow VIII in FIG. 7. As illustrated in FIGS. 7 and 8, the bottom surface 21a of the compressible member 21 is provided with a communication groove 21b, which allows communication between the inside and the outside of the speaker chamber 19 within the device case 10. The communication groove 21b of the compressible member 21 is compressed in the process of compressing the compressible member 21. This closes the communication groove 21b and blocks the communication between the inside and the outside of the speaker chamber 19 through the communication groove 21b.

For example, an end of the first rib 11b may be provided with a locking hook (not illustrated) which is designed to be locked to the back side of the speaker cover 84 when the amount of compression of the compressible member 21 reaches a predetermined amount. The communication groove 21b in the compressible member 21 may be configured to be compressed and closed slightly before the amount of compression of the compressible member 21 reaches the predetermined amount. The timing of closing the communication groove 21b in the process of compressing the compressible member 21 is not limited to that described above, and may be changed as appropriate.

Figure 9:
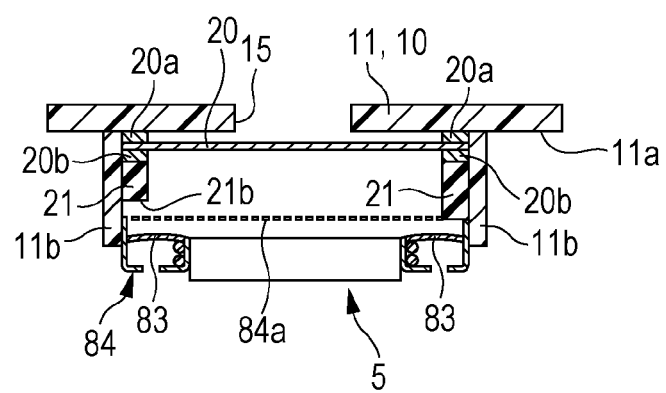
FIG. 9 illustrates a state before a communication groove is closed in a process of compressing the compressible member according to the embodiment.

In the present embodiment, in assembling the first speaker 5 to the device case 10, air in the speaker chamber 19 may be allowed to escape to the outside before the communication groove 21b is closed by being compressed in the process of compressing the compressible member 21. Note that the term "outside" refers to a region which is inside the device case 10 and outside the speaker chamber 19. FIG. 9 illustrates a state before the communication groove 21b is closed in the process of compressing the compressible member 21. By compressing the compressible member 21 while allowing air in the speaker chamber 19 to escape to the outside, it is possible to reduce an excessive increase in pressure in the speaker chamber 19 during assembly of the first speaker 5. Therefore, it is possible to reduce damage to the diaphragm 83 of the first speaker 5. Since it is possible to reduce application of continuous displacement to the diaphragm 83 during assembly of the first speaker 5, production variations may be made less likely to occur. Since a non-breathable sheet may be used as the waterproof film 20, even if the mobile phone 1 has been dropped in water many times, it is possible to reduce degradation of the waterproof function of the first speaker 5.

In the present embodiment, an adjustment is made such that the communication groove 21b is compressed in the process of compressing the compressible member 21. Therefore, the mobile phone 1 may be made available to the user with the communication groove 21b closed. Since the hermeticity or airtightness of the speaker chamber 19 may be kept at a high level when the mobile phone 1 is made available to the user, a high sensitivity of the first speaker 5 may be ensured. The timing of closing the communication groove 21b in the process of compressing the compressible member 21 may be adjusted, for example, by adjusting the ratio of the depth of the communication groove 21b to the thickness of the compressible member 21. Alternatively, the timing of closing the communication groove 21b may be adjusted by making the hardness of a region (hereinafter referred to as a "communication-groove region") of the compressible member 21 adjacent to the bottom surface 21a having the communication groove 21b in the thickness direction different from the hardness of the other region (hereinafter referred to as a "non-communication-groove region") of the compressible member 21. For example, in the compressible member 21, the hardness of the communication-groove region may be made greater than that of the non-communication-groove region. Thus, at an early stage of assembly of the first speaker 5, the non-communication-groove region in the compressible member 21 may be compressed first (selectively). After the non-communication-groove region is compressed, the communication-groove region in the compressible member 21 is compressed, so that the communication groove 21b may be closed at a final stage of assembly of the first speaker 5.

Although the bottom surface 21a of the compressible member 21 is provided with the communication groove 21b in the present embodiment, the configuration is not limited to this. For example, the compressible member 21 may be provided with a through hole in the middle in the thickness direction thereof, the through hole extending in the planar direction the compressible member 21. Until the middle of the process of assembling the first speaker 5, the communication through the through hole between the inside and the outside of the speaker chamber 19 within the device case 10 may be maintained so that the compressible member 21 is compressed while air in the speaker chamber 19 is being allowed to escape to the outside. Then, the through hole may be closed by being compressed in the process of compressing the compressible member 21. In the present embodiment, the communication groove 21b is an example of the opening that allows communication between the inside and the outside of the acoustic chamber space. The bottom surface 21a of the compressible member 21 having the communication groove 21b is an example of a pressed surface.

The waterproof structure and the waterproofing method for the second speaker 6 are the same as those for the first speaker 5. Therefore, the description of the functional effects for the first speaker 5 may be used to describe the second speaker 6. The waterproof structure of the microphone 4 described above may be applied to the waterproof structure of the first speaker 5 or the second speaker 6.

Modifications

Figure 10:
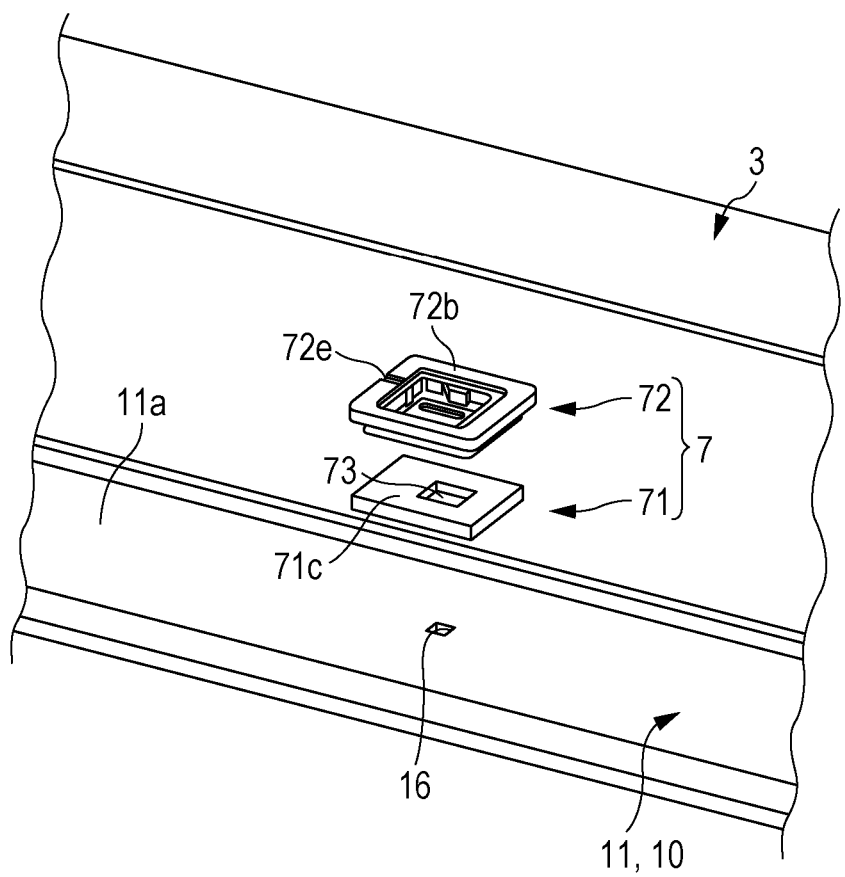
FIG. 10 is an exploded perspective view schematically illustrating a waterproof structure of the microphone according to a modification.
Figure 11:
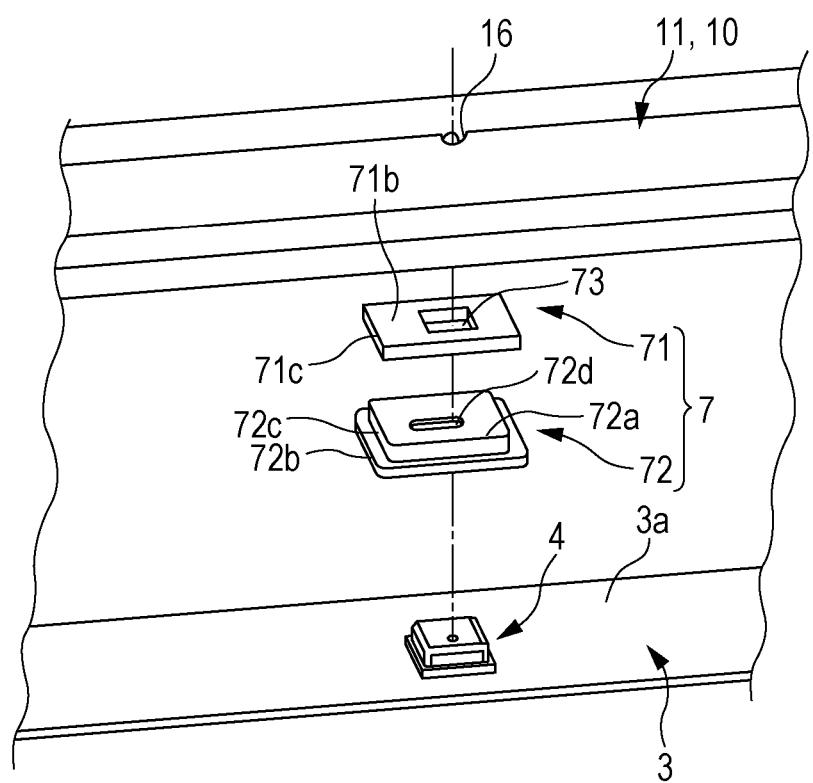
FIG. 11 is another exploded perspective view schematically illustrating the waterproof structure of the microphone according to the modification.

A modification of the mobile phone 1 according to the present embodiment will now be described. FIGS. 10 and 11 are each an exploded perspective view schematically illustrating a waterproof structure of the microphone 4 according to the modification. FIGS. 10 and 11 correspond to FIGS. 2 and 3 in the embodiment described above. In the present modification, the second compression portion 72 is provided with a communication groove 72e in a bottom surface of the second pad 72b. The communication groove 72e is formed in the bottom surface of the second pad 72b so as to allow communication between the inner and outer peripheries of the second pad 72b having an annular shape. Here, the bottom surface of the second pad 72*b* refers to a pressed surface pressed against the mounting surface 3*a* of the control board 3 during assembly of the microphone 4. In the present modification, the control board 3 is not provided with the air escape hole 3*b*.

In the mobile phone 1 of the present modification, in assembling the microphone 4 to the device case 10, the communication groove 72*e* of the second compression portion 72 allows communication between the inside and the outside of the microphone chamber 18 within the device case 10 until the middle of the process of compressing the compressible member 7. An adjustment is made such that the communication groove 72*e* of the second compression portion 72 is compressed in the middle of the process of compressing the compressible member 7. For example, in assembling the microphone 4, the communication groove 72*e* may be compressed and closed slightly before the fixing screws for securing the microphone 4 to the front case 11 are tightened by a predetermined amount. Thus, as in the embodiments described above, the compressible member 7 may be compressed while air in the microphone chamber 18 is being allowed to escape to the outside. It is thus possible to reduce an excessive increase in pressure in the microphone chamber 18 during assembly of the microphone 4. Therefore, it is possible to reduce damage to the diaphragm 41 in the microphone 4, and reduce production variations of the microphone 4.

The timing of closing the communication groove 72*e* in the process of compressing the compressible member 7 is not limited to that described above, and may be changed as appropriate. The timing of closing the communication groove 72*e* may be adjusted by the same technique as in the case of the communication groove 21*b* of the compressible member 21. For example, the timing of closing the communication groove 72*e* during assembly of the microphone 4 may be adjusted by adjusting the ratio of the depth of the communication groove 72*e* to the thickness of the second compression portion 72. Alternatively, the timing of closing the communication groove 72*e* may be adjusted by making the hardness of a region (hereinafter referred to as a "communication-groove region") of the second compression portion 72 adjacent to the bottom surface having the communication groove 72*e* in the thickness direction different from the hardness of the other region (hereinafter referred to as a "non-communication-groove region") of the second compression portion 72. For example, in the second compression portion 72, the hardness of the communication-groove region may be made greater than that of the non-communication-groove region. Thus, at an early stage of assembly of the microphone 4, the non-communication-groove region in the second compression portion 72 may be compressed first (selectively). After the non-communication-groove region is compressed, the communication-groove region in the second compression portion 72 is compressed, so that the communication groove 72*e* may be closed at a final stage of assembly of the microphone 4.

As described above, in the present modification, an adjustment is made such that the communication groove 72*e* is compressed in the process of compressing the compressible member 7. Therefore, the mobile phone 1 may be made available to the user with the communication groove 72*e* closed. Since the hermeticity or airtightness of the microphone chamber 18 may be kept at a high level when the mobile phone 1 is made available to the user, a high sensitivity of the microphone 4 may be ensured.

Various changes may be made to the embodiments described above without departing from the scope of the present disclosure. The embodiments and modifications described above may be combined together where possible. In the embodiments described above, the waterproof structure and the waterproofing method of the present disclosure are applied to a mobile phone which is an example of the mobile electronic device. The waterproof structure and the waterproofing method of the present disclosure are applicable to various mobile terminals, such as notebook computers and tablet computers.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A mobile electronic device comprising:
   a housing;
   an acoustic component disposed inside the housing;
   a cover attached to the acoustic component and disposed inside the housing;
   a sound hole formed in the housing, the sound hole being configured to allow communication between an inside and an outside of the housing;
   a non-breathable waterproof film disposed inside the housing, the non-breathable waterproof film being configured to cover the sound hole and being disposed between the sound hole and the cover; and
   a compressible member disposed within the housing, and disposed between the non-breathable waterproof film and the cover,
   wherein the compressible member is configured to be compressed by being pressed against the cover during assembly of the acoustic component to the housing,
   wherein the non-breathable waterproof film, the cover and the compressible member define an acoustic component chamber, the acoustic component chamber being configured to hermetically seal the acoustic component, and
   wherein the compressible member includes a communication groove at an end of the compressible member that is closest to the cover, the communication groove being configured to allow communication between the inside of the acoustic component chamber and a space defined by the housing.

2. A method for waterproofing a mobile electronic device including
   a housing;
   an acoustic component disposed inside the housing;
   a cover attached to the acoustic component and disposed inside the housing;
   a sound hole formed in the housing, the sound hole being configured to allow communication between an inside and an outside of the housing;
   a non-breathable waterproof film disposed inside the housing, the non-breathable waterproof film being configured to cover the sound hole and being disposed between the sound hole and the cover; and
   a compressible member disposed within the housing, and disposed between the non-breathable waterproof film and the cover, wherein the compressible member is configured to be compressed by being pressed against the cover during assembly of the acoustic component to the housing, wherein the non-breathable waterproof film, the cover and the compressible member define an acoustic component chamber, the acoustic component chamber being configured to hermetically seal the acoustic component, and wherein the compressible member includes a communication groove at an end of the compressible member that is closest to the cover, communication groove being configured to allow communication between an inside of the acoustic component chamber and a space defined by the housing, the method comprising:

during a first process of compressing the compressible member, compressing the compressible member while allowing air in the acoustic component chamber to escape through the communication groove to the space defined by the housing, and in a second process of compressing the compressible member after the first process, closing the communication groove while compressing the compressible member thereby creating an airtight seal, wherein air flow from the space within the mobile electronic device to the inside of the acoustic component chamber through the communication groove is blocked.

* * * * *